US005865863A

United States Patent [19]

DeSousa et al.

[11] Patent Number: 5,865,863

[45] Date of Patent: Feb. 2, 1999

[54] COMBINED AIR CLEANER-RESONATOR

[75] Inventors: Joseph DeSousa, Chatham; Michael G. Lehti, Windsor, both of Canada

[73] Assignee: Siemens Electric Limited, Tilbury, Canada

[21] Appl. No.: 848,416

[22] Filed: May 8, 1997

[51] Int. Cl.[6] .................... B01D 39/18

[52] U.S. Cl. .................... 55/385.3; 55/497; 55/510; 55/DIG. 28; 123/198 E

[58] Field of Search .................... 55/276, 385.3, 55/DIG. 20, DIG. 21, DIG. 28, 497, 510; 123/198 E

[56] References Cited

U.S. PATENT DOCUMENTS

| | | | |
|---|---|---|---|
| 4,628,689 | 12/1986 | Jourdan | 55/276 |
| 4,790,864 | 12/1988 | Kostun . | |
| 5,059,221 | 10/1991 | McWilliam | 55/276 |
| 5,148,786 | 9/1992 | Matsumura et al. | 55/276 |
| 5,163,387 | 11/1992 | Lee . | |
| 5,424,494 | 6/1995 | Houle et al. . | |
| 5,627,351 | 5/1997 | Okuma et al. | 55/276 |

FOREIGN PATENT DOCUMENTS

| | | | |
|---|---|---|---|
| 1233817 | 10/1960 | France | 55/276 |
| 0156245 | 12/1980 | Japan | 55/276 |
| 0044016A | 3/1985 | Japan | 55/274 |
| 467194 | 6/1937 | United Kingdom | 55/276 |

*Primary Examiner*—Jay H. Woo
*Assistant Examiner*—Minh-Chau Pham

[57] ABSTRACT

A combined air cleaner and noise attenuating resonator device including a hollow cylindrical air cleaner element pressed to a fitting on a hose, the fitting latched to the housing in a position holding the air cleaner filter element within a cavity in a housing. An expansion chamber and a Helmholtz resonator chamber are both defined in part in the housing and by an insert piece within the housing which also forms an air flow passage in fluid communication with each chamber.

10 Claims, 5 Drawing Sheets

COMBINED AIR CLEANER-RESONATOR

BACKGROUND OF THE INVENTION

This invention concerns air induction systems for internal combustion engines. Modern engines for automotive power plants incorporate one or more resonator chamber devices in the air induction system in order to reduce engine noise. Conventionally, each resonator device comprises a separate component which must be connected into the induction system typically using hoses and clamps to connect the device to the air cleaner and throttle body. This involves significant labor, extra parts, and potential leak points allowing entry of dust.

In an effort to simplify the air induction system and lower costs, the air cleaner sometimes includes a resonator chamber in the housing into which the air cleaner element is installed. An example of such a system is shown in U.S. Pat. No. 4,790,864, issued on Dec. 13, 1988 for a "Compact Engine Air Cleaner with Integrated Components".

Resonator devices include both expansion chamber and Helmholtz resonators which are each designed to attenuate noise in different frequency ranges. Even where one type of resonator is integrated into the air cleaner housing, typically the other type is often installed as a separate component, although integration of both types in a separate component is shown in U.S. Pat. No. 5,424,494, issued on Jun. 13, 1995 to the assignee of the present application.

Copending application U.S. Ser. No. 08/842,252 filed on Apr. 24, 1997, assigned to the same assignee as the present application, attorney docket No. 97P7659US, describes a connector hose between the air cleaner and throttle body which has both types of resonator integrated with the connector hose.

Automotive air cleaner elements often are rectangular in shape and are sealed by engagement of a large rectangular cover around the entire perimeter of the seal. The air cleaner housing is usually of molded plastic, and larger molded structures sometimes are slightly warped, creating leak points where dust can bypass the air filter and enter the engine.

More costly stronger plastic materials are often used to avoid this problem, thus increasing costs.

An object of the present invention is to provide an air induction system having an air cleaner which incorporates both an expansion chamber and a Helmholtz resonator.

Another object of the present invention is to provide an air cleaner assembly for an automotive air induction system which does not rely on establishing complete sealing engagement of covers or other housing parts with the filter element.

SUMMARY OF THE INVENTION

The present invention includes a tubular air cleaner element having one end completely closed with an end cap, the other end having a sealing ring receiving an end of a coupling fitting on one end of a hose directing air flow to the engine throttle body.

An air cleaner housing defining an interior space has an opening able to receive the air cleaner filter element so that it can be inserted into a receiving space in the housing, the hose fitting including a locking arrangement for detachable connection to the housing wall adjacent the opening to secure the air cleaner element in position.

The housing also has two different resonator devices defined within the interior, including an expansion chamber and Helmholtz chamber.

Each chamber is formed by an interfit cover, base, and an insert piece, each preferably molded plastic members which can be friction welded or otherwise joined together into a unitary structure. The expansion chamber is defined about a slot formed into an inlet passage and a tube connects the inlet passage and a Helmholtz chamber defined in other regions within the housing. The inlet passage leads to the air cleaner filter element cavity also defined within the housing interior space.

DETAILED DESCRIPTION

Figure 1:
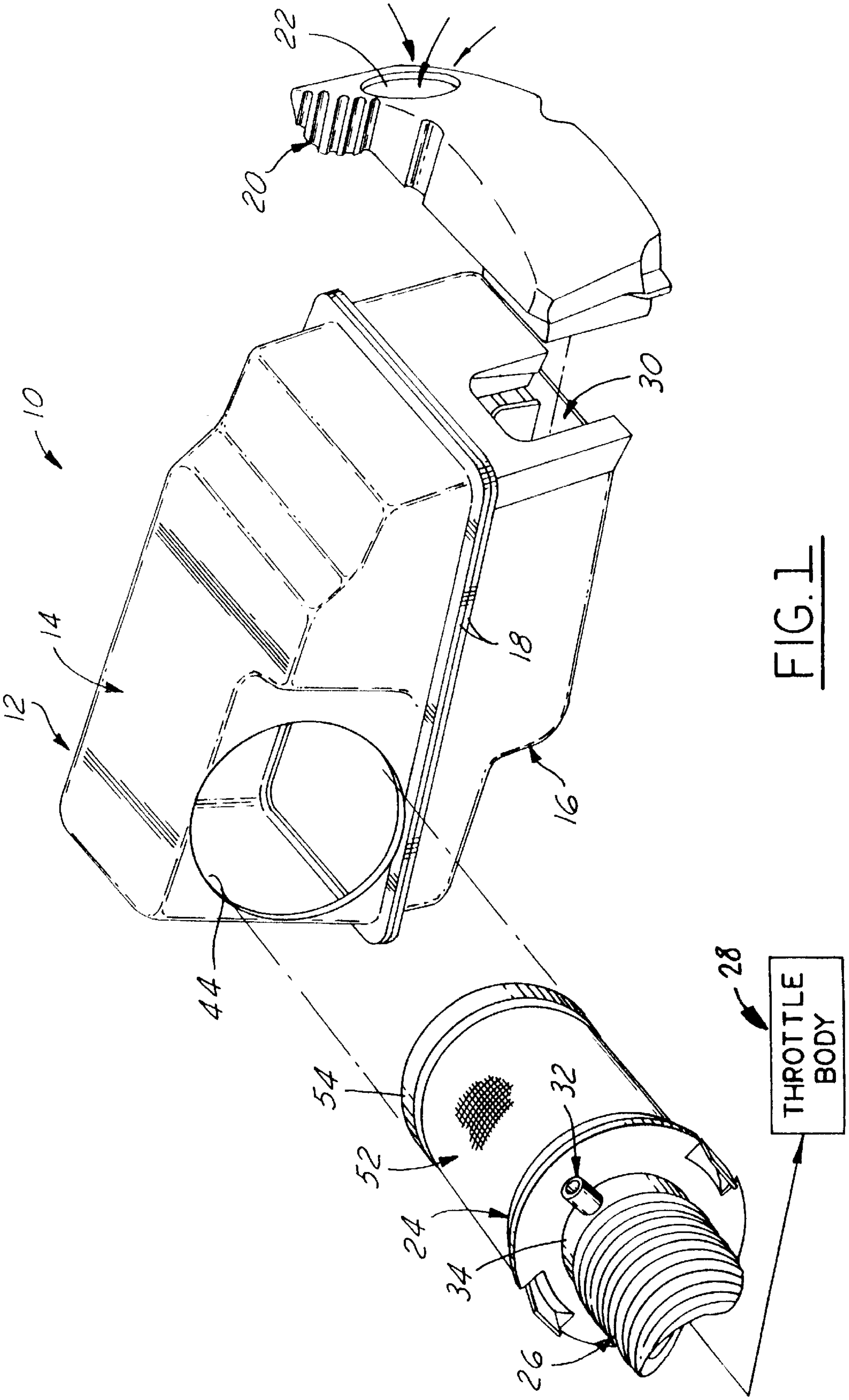
FIG. 1 is a partially exploded perspective view of an air cleaner-resonator device according to the present invention and installed hose fitting and air scoop.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

An exterior view of the air cleaner-resonator 10 according to the present invention, which includes a housing 12 defining an interior space, the housing 12 constructed of two pieces, a cover piece 14 and a base 16, friction welded together along abutting flange edges 18 to form a unitary structure. An integral mounting tab 15 allows a bolt mounting of the unit to the vehicle sheet metal or engine.

The cover 14 and base 16 may be of a molded plastic such as nylon or polypropylene, and may be reinforced as required for a particular application.

A fresh air intake scoop 20 is installed on the front side of the housing 12 to locate an air intake port 22 at a location beneath the hood where fresh air is available, directing the fresh air flow to an air intake port 30 in the base 16.

A hose coupling fitting 24 is latched in a side opening 44 in the cover 14 connecting the housing 12 to a hose 26, connected to the engine throttle body 28 and mounted on the intake manifold (not shown).

A nipple 32 for connection to a PCV is integral with the hose coupling fitting 24. The hose 26 is preferably molded to an outward projecting tube 34 integral with the coupling fitting 24 to eliminate the need for a clamped connection, the hose 26 and fitting 24 thus forming a single part.

Figure 2:
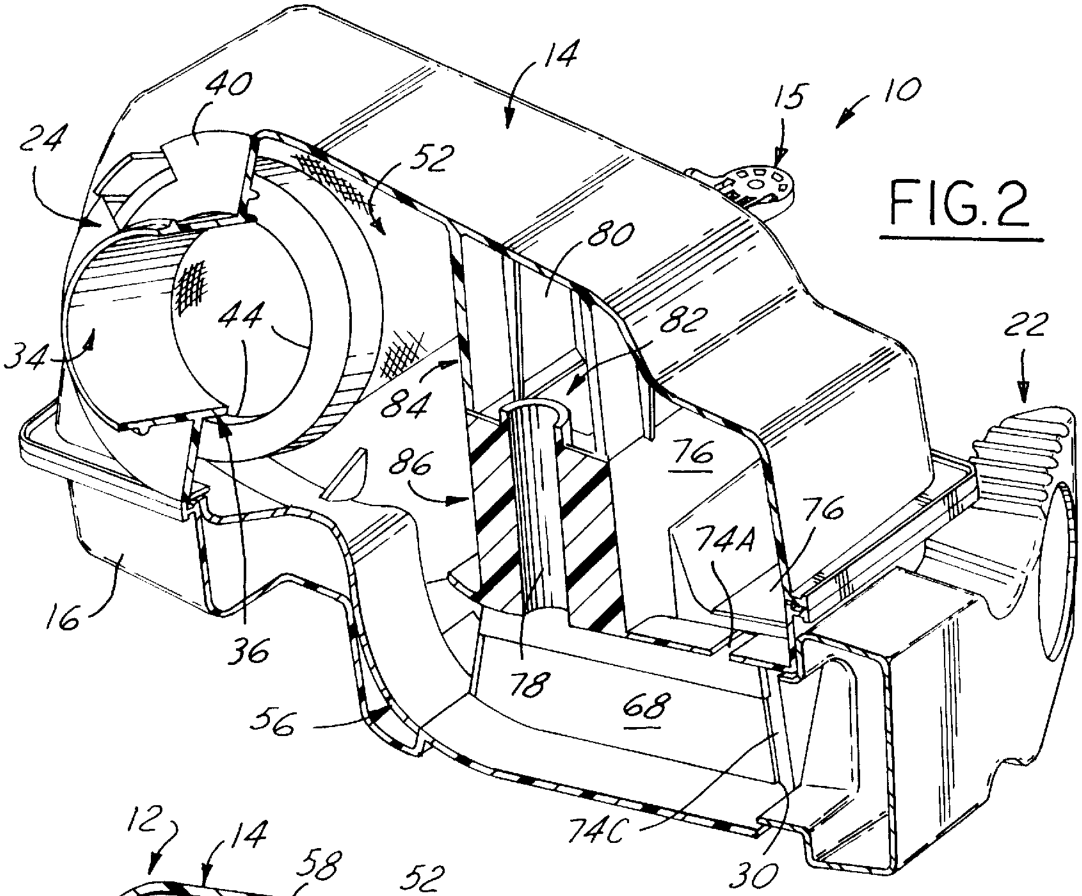
FIG. 2 is a perspective view of the air cleaner-resonator device shown in FIG. 1 with portions broken away to show interior details and components.
Figure 3:
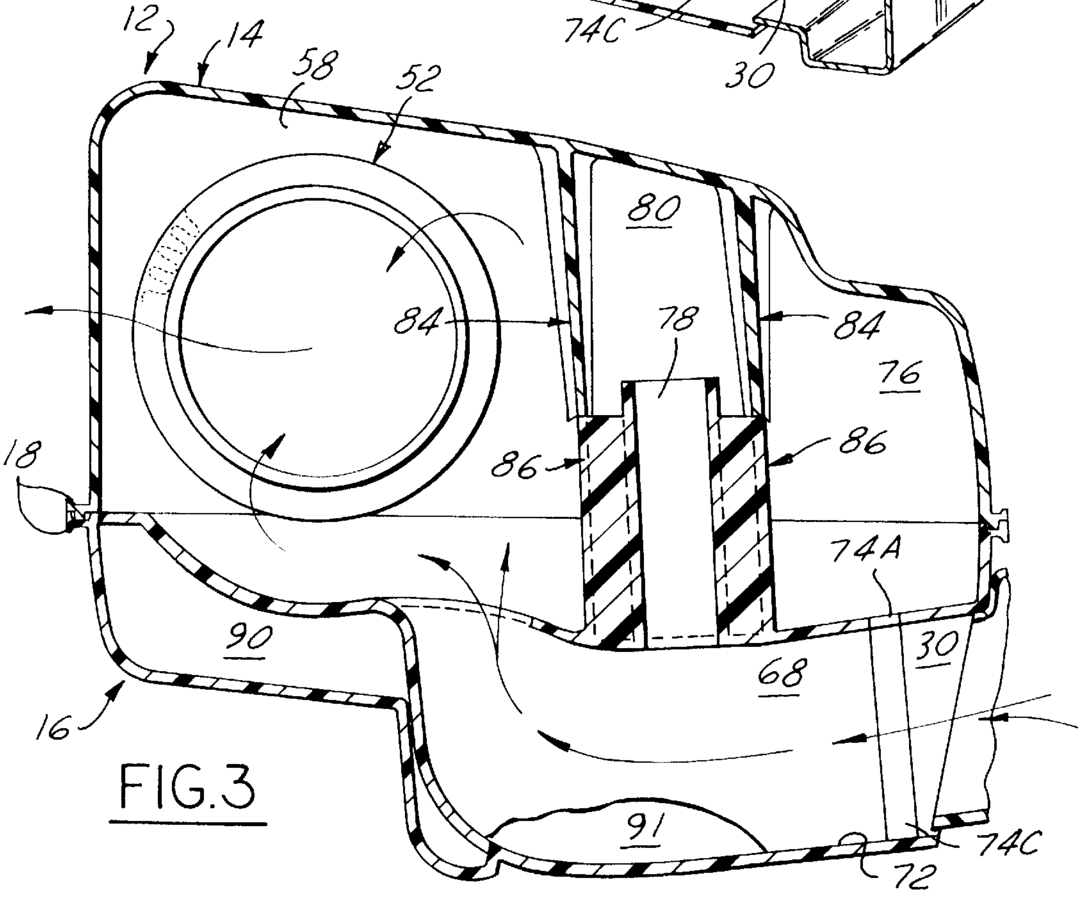
FIG. 3 is a view of a section taken along the length of the air cleaner-resonator device shown in FIGS. 1 and 3.
Figure 4:
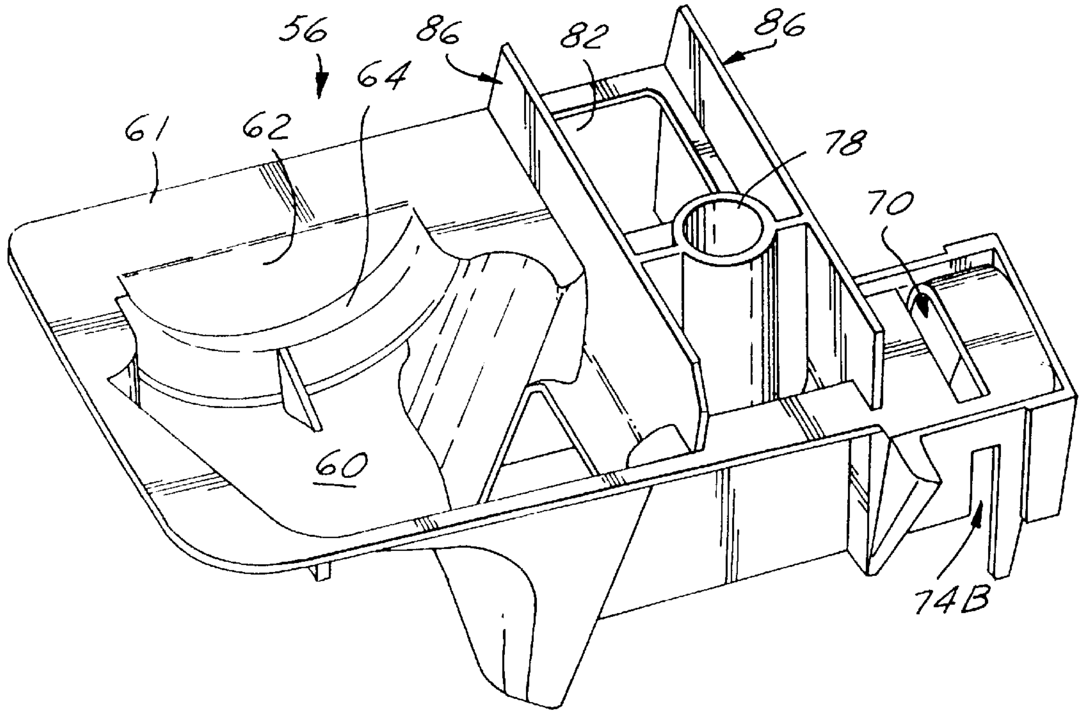
FIG. 4 is a perspective view of an insert disposed within the air cleaner-resonator housing.
Figure 4A:
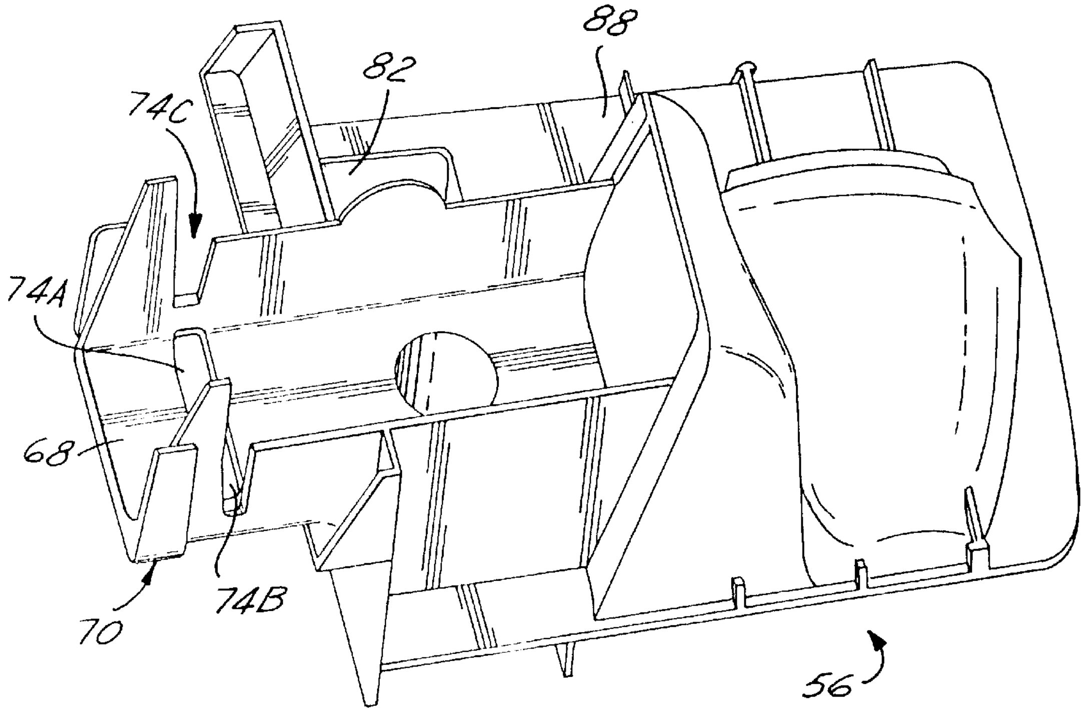
FIG. 4A is an inverted perspective view of the insert shown in FIG. 4.

The coupling fitting 24 has an oppositely projecting tube 36 concentric with a circumferential series of axially projecting locator fingers 38 arrayed about the perimeter of a flange 40. A pair of spring fingers 42 extend into slots in the flange 40 to allow ridges 46 to bend in as the fitting 24 is inserted in the side opening 44 in the side of the cover 14 (FIG. 2), the ridges 46 engaging the edges of the opening 44 when the fingers 42 snap out again, keeping the fitting 24 from pulling back out of the opening 44 in the cover 14.

Figure 5:
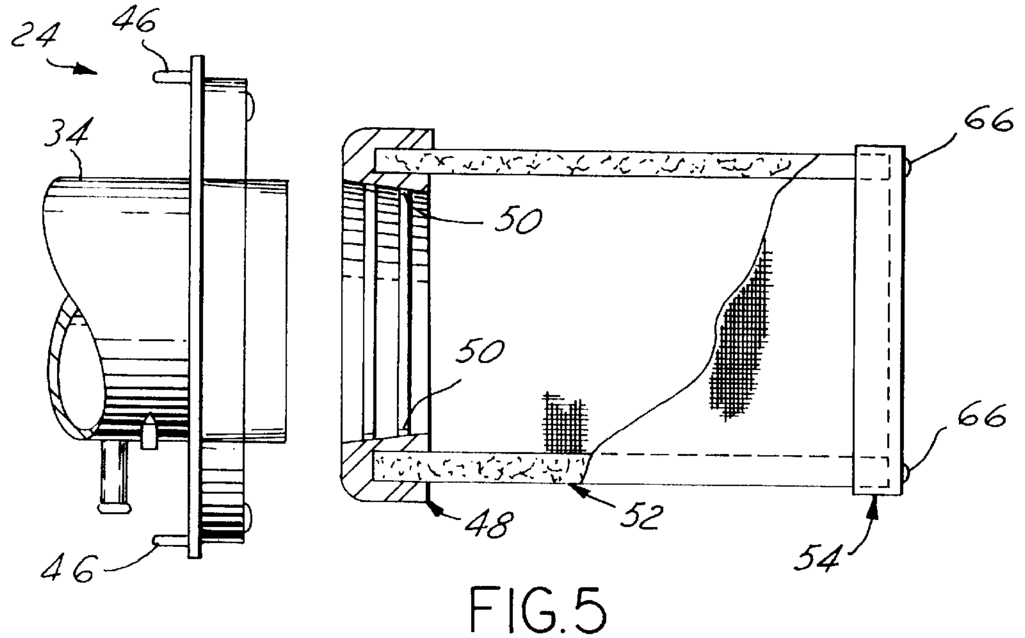
FIG. 5 is a lengthwise sectional view through the air filter element and a fragmentary mating portion of the hose coupling fitting.
Figure 6:
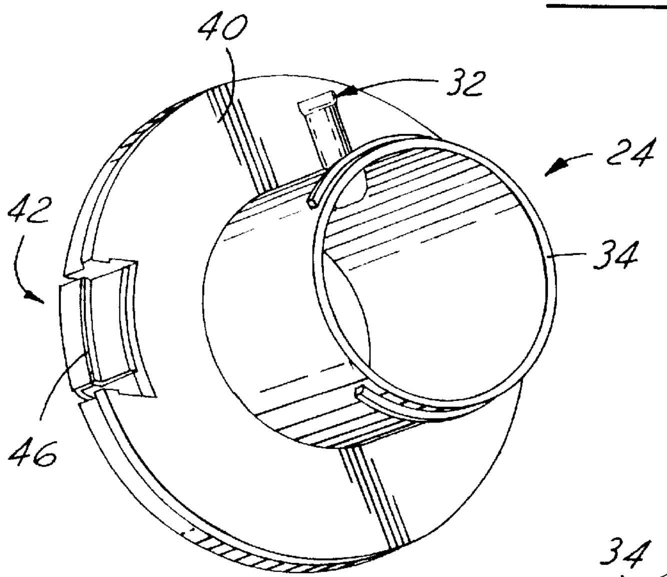
FIG. 6 is a perspective view of the outside of the hose coupling fitting.
Figure 7:
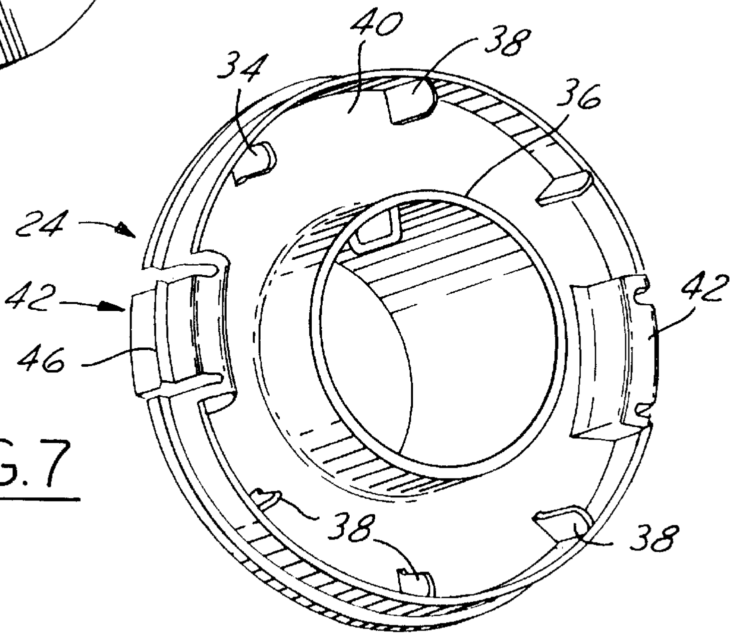
FIG. 7 is a perspective view of the inside of the hose coupling fitting.

The inwardly projecting tube 36 is press fit into an elastomeric sealing end cap 48 defining an opening into the interior closed space defined by a hollow cylindrical filter element 52 (FIG. 5), a ridged tapered seal portion 50 press fit to the tube 36 to install the filter element 52.

The filter element 52 is located within projecting fingers 38 on the inside of the fitting 24. A closed end cap 54 is installed at the other end of the filter element 52 so that the filter element 52 is essentially sealed only to the fitting 24 and hose 26. The filter element 52 is first installed onto the fitting 24, and the filter element 52 advanced through the opening 44 until the flange 40 of the coupling fitting 24 abuts against the flat side of the cover 14 side wall and the spring fingers latch against the inside of the cover side wall.

Referring to FIGS. 3–5A, the interior details can be seen, in which various passages and spaces are defined within the interior space enclosed by the combination of the cover 14, base 16, and a molded plastic insert piece 56 held between the cover 14 and base 16.

The filter element 52 is a hollow cylinder and is disposed in a filter cavity 58 defined above an arcuate surface 60 of the insert 56. A vertical end wall 62 adjacent an arcuate shelf 64 receives and support the closed end cap 54 of the filter element 52. Compressible fingers66 may be molded into the end cap 54 to allow the filter element 52 to be easily held between the cover 14 side wall and the surface 60 of the insert piece 56.

Air enters the port 30 (via the scoop 20) and into an entrance passage 68 defined by a U-shaped portion 70 of the insert piece 56 and the bottom wall of the base 16. A slot has several sections 74A, 74B, 74C extending around U-shaped portion 70 which allows communication with an expansion chamber 76 of a predetermined volume located above and to the rear of the passage 68, defined by sections of the insert piece 56, cover 14, and base 16 above and to the rear of air passage 68.

Just beyond the slots 74A, 74B, 74C, a Helmholtz tube 78 enters into the passage 68.

A Helmholtz chamber 80 of a predetermined volume is defined above the passage 68, as well as by a space to the rear through window 82 and also the space 90 beneath the filter cavity 58 defined by surface 60 and 61, gap 88 allowing communication therewith. Partitions 84 in the cover 14 mate with partitions 86 in the insert piece 56 defining portions of the Helmholtz chamber 80.

Figure 8:
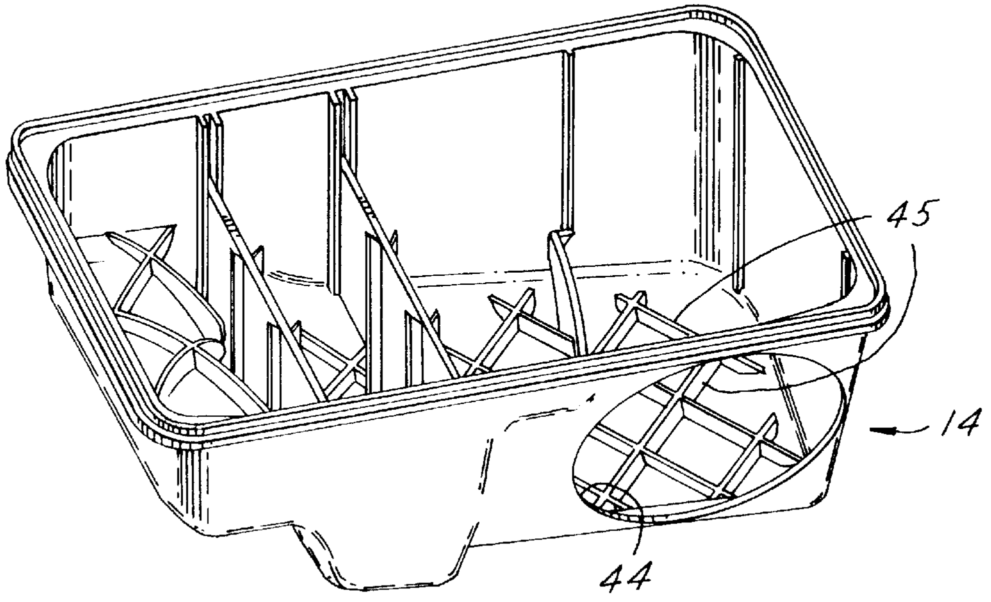
FIG. 8 is an inverted perspective view of the cover forming in part the air cleaner housing.

As seen in FIG. 8, a pattern of stiffening cross ribs 45 are molded into the inside of open areas of the cover 14 between the side walls, the ribs 45 also provided on the base 16, so that stiffness is sufficient to resist creation of noise by drum-like vibrations of the combined unitary structure.

This construction eliminates sealing problems as the rectangular housing components are not required to seal to the filter element 52, with only a reliable annular seal required.

At the same time, both expansion and Helmholtz chambers are provided in the air cleaner housing. The enclosed space is efficiently used for each chamber as required by intercommunicated regions defined by the cover 14, base 16, and insert piece 56, to reduce bulk and to eliminate the need for carefully sealed connections to each component.

It should be noted that the resonator chambers are both upstream of the completely self-sealed air cleaner element, and hence external sealing of those chambers is not critical as all air then passes through the filter element 52.

The concept lends itself to adaptation to the space requirements of each vehicle, as the components can be easily reconfigured.

The shape and size of the cover and base are contemplated as being closely matched to the available space beneath the hood.

Figure 9:
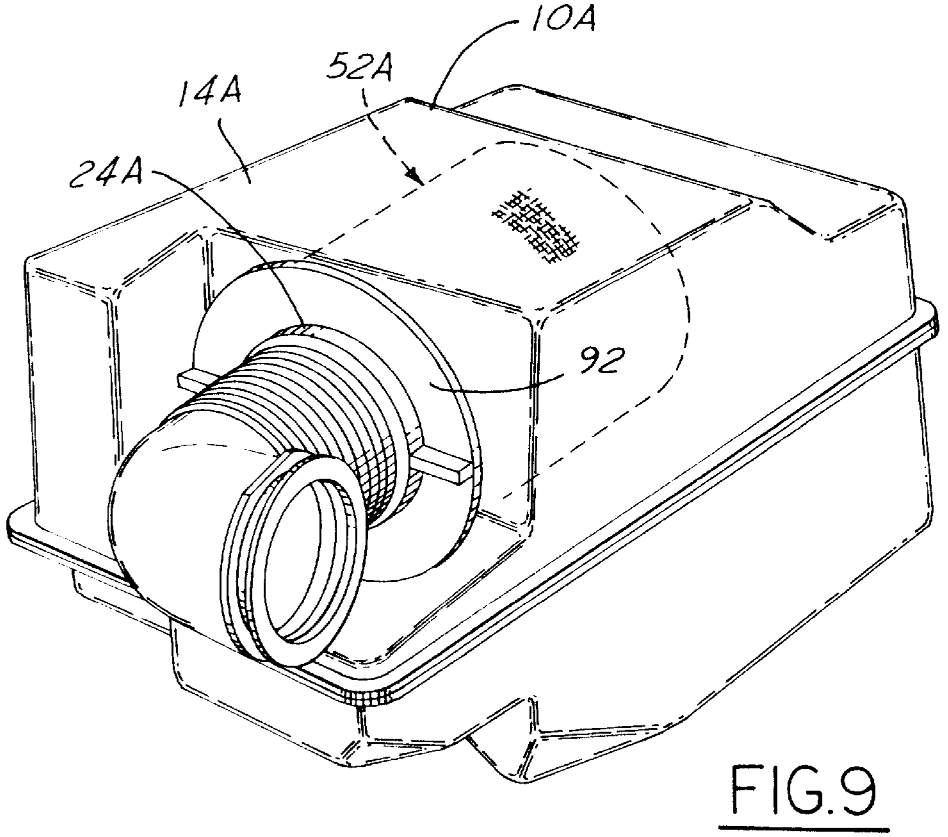
FIG. 9 is a perspective view of an alternate form of the air filter-resonator according to the present invention.

FIG. 9 illustrates another such configuration of an air cleaner-resonator 10A in which the filter element 52A is mounted into the end of the cover 14A.

A camming locking ring 92 is captured on a hose coupling fitting 24A to secure the same after installing the filter element 52A.

Many other variations in the configuration are possible, such as locating the fresh air intake port on the side of the cover.

Servicing of the air filter element of either embodiment is readily carried out by release of either the spring fingers of fitting 24 or rotation of the cam locking ring 92, and pulling out the filter element 52 or 52A with the fitting 24, 24A. The filter element is simply pulled off the tube end of fitting 24, 24A inserted into the open end of a replacement air filter element 52, 52A. The filter element 52, 52A is inserted into opening 44 and the spring fingers reset or the cam locking ring 92 rotated to lock the fitting 24A in position.

We claim:

1. An air cleaner for an air induction system of an automotive engine having a throttle body controlling air flow into said engine, said air cleaner comprising:

- a housing having an interior space defined therein, including an air cleaner fllter element cavity and also having an air intake port communicating with said filter element cavity in said interior space;
- a hollow air cleaner filter element defining a closed space having an opening therein;
- a hose coupling fitting engageable with said opening of said air cleaner filter element to be sealed thereto;
- said air cleaner filter element with said hose coupling fitting mounted thereto insertable through an outlet opening in said housing to be received in said air cleaner filter element cavity in said housing interior space, said air cleaner filter element not sealed to said housing;
- a hose sealed at one end to said hose coupling fitting and at the other end said throttle body; and
- said hose coupling fitting detachably connected to said housing to secure said air filter element positioned in said air cleaner filter element cavity.

2. The air cleaner according to claim 1 wherein said air cleaner filter element comprises a hollow cylinder closed at one end, the other end comprising said opening therein.

3. The air cleaner according to claim 1 further including an air flow passage in said housing connecting said air cleaner filter element cavity with said air intake port.

4. The air cleaner according to claim 1 wherein said connector hose is sealingly molded to a tubular outwardly protruding portion of said hose coupling fitting.

5. The air cleaner according to claim 3 further including at least one resonator chamber defined in said housing interior space and communicating with said air flow passage.

6. The air cleaner according to claim 3 further including an expansion chamber and a Helmholtz resonator defined in said housing interior space, each in fluid communication with said air flow passage.

7. The air cleaner according to claim 5 wherein said resonator chamber comprises an expansion chamber contiguous to said air flow passage, said air flow passage having a slotted opening extending into said expansion chamber.

8. The air cleaner according to claim 7 further including a Helmholtz resonator chamber defined in said housing interior space adjacent said expansion chamber, and a tubular fluid connection between said Helmholtz resonator chamber and said air flow passage.

9. The air cleaner according to claim 5 further including a molded plastic insert piece disposed in said housing and defining in part said air cleaner filter element cavity and said at least one resonator chamber.

10. The air cleaner according to claim 9 wherein said housing comprises a molded plastic cover and a molded plastic base, each having abutting perimeter edges joined together to form a unitary structure.

* * * * *